May 8, 1951 A. L. ARENBERG ET AL 2,552,389
READING LIGHT FIXTURE FOR VEHICLE INTERIOR ILLUMINATION
Filed Dec. 26, 1946 3 Sheets-Sheet 1
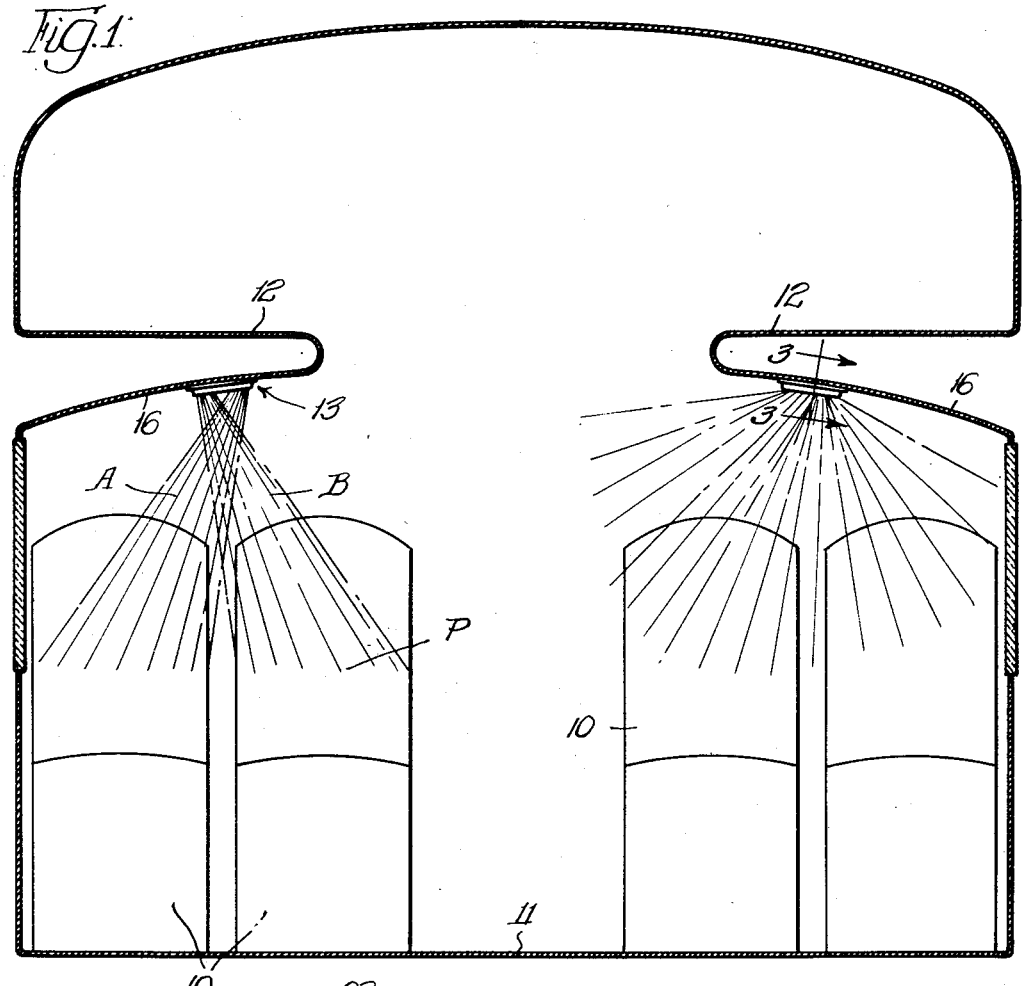
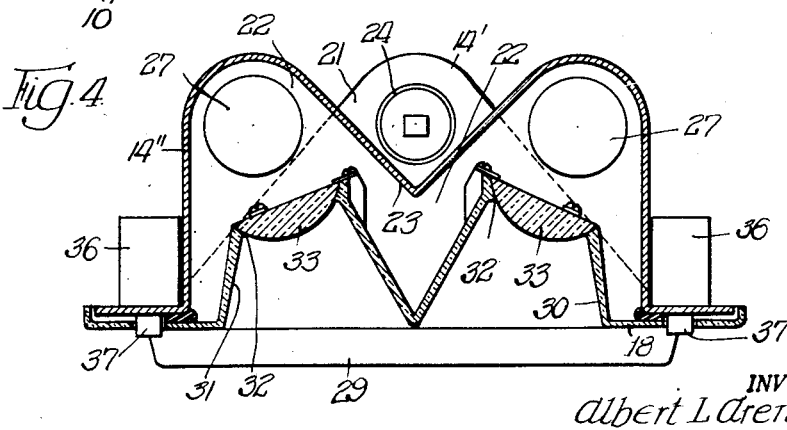
INVENTORS.
Albert L. Arenberg,
Edward C. Zimmerman,
By Cromwell, Greist & Warden
Attys.

May 8, 1951 A. L. ARENBERG ET AL 2,552,389
READING LIGHT FIXTURE FOR VEHICLE INTERIOR ILLUMINATION
Filed Dec. 26, 1946 3 Sheets-Sheet 2
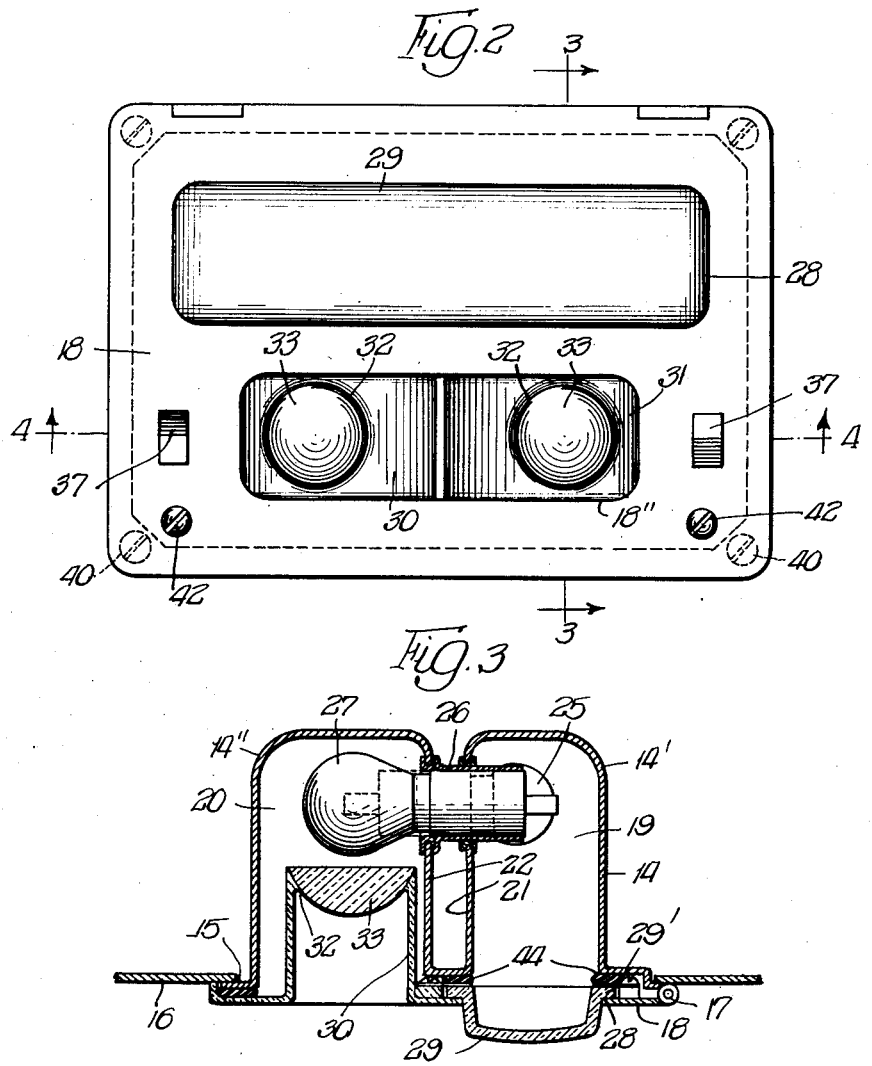
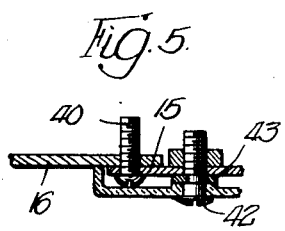
INVENTOR.
Albert L. Arenberg
Edward C. Zimmerman
By Cromwell, Greist & Warden
attys.

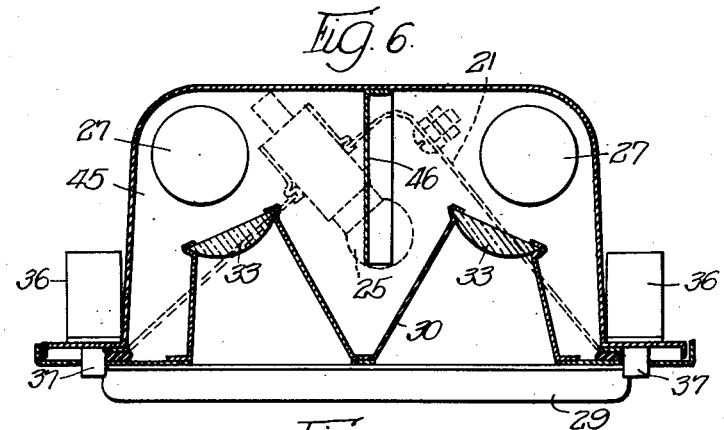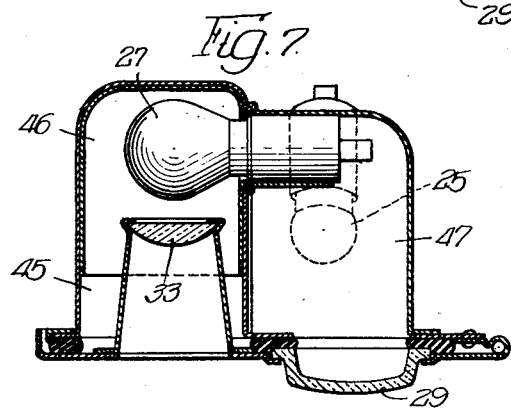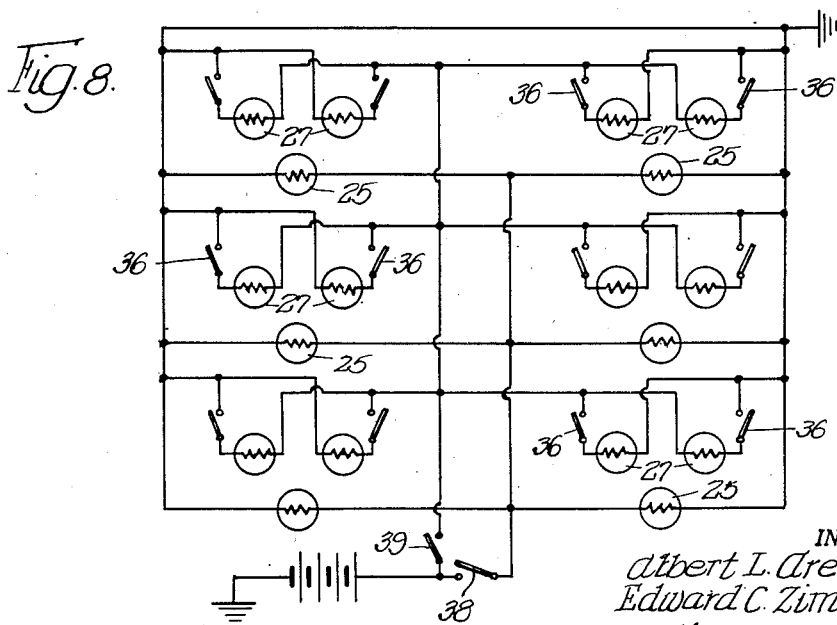

Patented May 8, 1951

2,552,389

UNITED STATES PATENT OFFICE 2,552,389

READING LIGHT FIXTURE FOR VEHICLE INTERIOR ILLUMINATION

Albert L. Arenberg, Highland Park, and Edward C. Zimmerman, Winnetka, Ill., assignors to Patent License Corporation, Chicago, Ill., a corporation of Illinois Application December 26, 1946, Serial No. 718,414

6 Claims. (Cl. 240—7.35)

This invention relates to improvements in a system for illuminating the interior of certain types of passenger vehicles, such as busses and aircraft, by a moderate diffused general lighting or by individual, separately controlled reading beams at the several passenger locations.

It is an object of the invention to provide a vehicle lighting system of the type described, which is adapted to provide individual reading beams controlled by the passengers individually and directed downwardly onto the reading plane of said passengers, on either side of a central aisle of the vehicle; and also, under the sole control of the vehicle operator, to afford a cheerful, diffused illumination of the interior of the vehicle.

Another object is to provide an illumination system of the type described wherein individual reading lights for the passengers and further diffused illumination means for the interior of the vehicle are energized on separate electrical circuits, controllable respectively by the individual passengers and by the driver to the exclusion of the passengers, whereby to afford, in addition to individual reading beams available to the passengers enroute, a generally diffused and inviting illumination of the interior of the vehicle during its stay in a station, airport or depot.

The foregoing statements are indicative in a general way of the nature of the invention, but other and more specific objects will be apparent to those skilled in the art upon a full understanding of construction and operation of the device.

A single embodiment of the invention is presented herein for purpose of exemplification, but it will be appreciated that the invention is susceptible of incorporation in other modified forms coming equally within the scope of the appended claims.

In the drawings:

Fig. 1 is a diagrammatic view in transverse vertical cross section, generally representing the interior of a bus or like intercity vehicle and illustrating the operation of the system of my invention under different conditions which it is desired to satisfy;

Fig. 2 is an enlarged bottom plan view of an illuminating unit employed in the invention, as viewed by a passenger from the exposed lower side thereof;

Fig. 3 is a fragmentary transverse sectional view, taken along a line generally corresponding to line 3—3 of Figs. 1 and 2;

Fig. 4 is a view in longitudinal section on a line generally corresponding to line 4—4 of Fig. 2;

Fig. 5 is a fragmentary detail illustrating the manner of mounting the light fixture or unit in the bus interior in accordance with the invention;

Fig. 6 is a view in longitudinal vertical section through a light housing for the illuminating system of the invention, in accordance with a modified embodiment thereof;

Fig. 7 is a view in transverse section through the housing in Fig. 6, further illustrating structural details thereof; and Fig. 8 is a schematic wiring diagram adapted for use in association with a system of the foregoing type.

This invention affords a system of passenger vehicle illumination, particularly devised for inter-city busses, aircraft and like vehicles, although its general adaptability to the interior illumination of related vehicle structures will be apparent. A system is provided by which the individual passengers are furnished with individually controllable reading beams, intensified and focused onto the reading plane of the passenger, along with a further general and diffused illumination of the interior of the vehicle, operated solely under the control of the driver or vehicle operator, as when the vehicle is entering or waiting in a station, thereby affording a cheerful and attractive illumination at such times.

A further feature of improvement resides in a novel design of light housing for the system of the invention, in accordance with either of two alternative embodiments of said housing, which results in substantial compacting of a housing structure for a given spread of light beams emitted therefrom.

Referring to the drawings, in Fig. 1 there is illustrated, for example, a section of the interior of an inter-city bus, wherein the seats 10 are arranged in rows of pairs on either side of a central aisle 11, underneath a standard, laterally projecting luggage rack 12, on which the illumination units in accordance with the invention, designated 13, are mounted. Although the present application, for purpose of illustration, shows and describes a preferred embodiment of the unit as a single fixture mounted in the luggage rack 13 in an overhead and central position as regards the seats of each pair, it will be evident to those skilled in the art, as the description proceeds, that other arrangements of the various components of the illuminating units are possible within the purview of the invention.

Each of the units 13 embodies a fixture which comprises a dual-chamber housing 14, open at its lower end and peripherally flanged around the opening at 15 for abutment with the under side 16 of the luggage rack. As illustrated in Fig. 3, the flange 15 on one side thereof has an extruded or like hinge 17, whereby a cover plate 18 of the fixture is pivotally connected to the housing, said plate being swingable downwardly to expose the interior of the housing when desired. The cover plate is appropriately apertured to carry certain light transmitting members, all as hereinafter described in greater detail.

Housing 14 is divided into two chambers, specifically denoted 19 and 20 (see Fig. 3) by the wall or partition members 21, 22 which are integrally connected adjacent the lower open end of the housing. The formation of said chambers, as well as the shape of the housing as a whole, can be appreciated by a correlation and comparison of Figs. 2, 3 and 4. It will be noted that the portion or member of the housing 14 defining chamber 19, specifically 14', is of generally triangular outline in elevation and the remaining portion 14" enclosing chamber 20 is upwardly lobed, being thus further subdivided partially into two communicating halves by a V-shaped, downwardly convergent top wall panel 23. Nevertheless, the dual housing 14 is fabricated as a single stamping and is thereby rendered relatively inexpensive of production.

As illustrated in Fig. 4, the partition wall 21 of the housing member 14' is centrally apertured and provided with a fitting 24, at a relatively elevated point relative to housing member 14", for the reception of a standard electrical socket adapted to mount a standard, low candle power and voltage lamp 25. The adjacent partition 22 of housing member 14" is likewise apertured in the upper portion of the respective lobes thereof and provided with fittings 26 crimped in the apertures in which are mounted sockets for two standard lamps 27 of somewhat higher candle power than lamp 25. The internal walls of the housing portion or member 14", and in particular the interior surfaces of the V-shaped wall 23 and end walls adjacent lamps 27 may serve as light reflectors, and to this end the interior of this part of the housing may be polished or painted to intensify the beam transmitted by the light sources 27.

Referring to Figs. 2, 3 and 5, the cover plate 18, immediately beneath the housing chamber 19, is provided with an elongated aperture 28 receiving and supporting a hollow, convex window 29 or light transmissive panel of downwardly projecting, flanged section. This panel is treated either externally or internally to render the same light diffusing in character; and it is supported by its peripheral flange 29' in the opening 28. Beneath housing chamber 20 the plate 18 is conformed to provide separate, upwardly extending and tapered, sleevelike lens mounts 30, 31, each of which presents at its upper extremity an opening 32 in which an individual plano-convex condensing lens 33 is disposed. The inner surface of the sleeve-like mounts 30, 31 is preferably darkened to minimize reflection. It will be noted that the relationship of the two sets of lamp 27, lens 33 and mount 30 or 31 is such as to result in the production of two intensified, downwardly directed, intersecting beams A and B (see Fig. 1, on the left hand side thereof) which impinge the reading planes P of adjacent seats 10 in a very efficient manner. The fixture is notable for its compactness in this respect, requiring very little space for the production of the dual cross-beam illumination illustrated in the portion of Fig. 1 referred to, as compared to other possible arrangements. However, it should be understood that in its broader aspects the invention is not necessarily limited to the employment of the specific fixture shown. Those skilled in the art will readily perceive other arrangements for achieving a similar result.

The lamps 27 are controlled by individual toggle switches 36 on either end of the housing 14 appropriately wired to said lamps and the cover plate 18 is provided with apertures through which the finger pieces 37 of said switches extend, in a convenient position for individual manipulation by the occupants of the seats 10 therebeneath. The lamp 25 in housing member 14' is not controlled by the seat occupants but is, on the contrary, under the exclusive control of the driver or operator of the vehicle, being wired in a separate hookup to that end.

In Fig. 8 there is illustrated a wiring diagram whereby control of the various individual reading lights and the diffused illuminating lights is effected, the details of this wiring diagram being self-explanatory. A switch whereby all the lamps 25 are simultaneously turned on or off by the operator is designated 38 and, if desired, a further master switch 39 for all the individual lamps 27 may also be included in the circuit. It will be understood that master switch 39 is normally closed when the reading lights 27 are to be employed, and that switch 38 is ordinarily open, except when the vehicle is in a station or under an extraordinary circumstance when it is desired to illuminate the interior by lamps 25 en route.

Certain specific details of mounting of the housing relative to the surface 16 are illustrated in Fig. 5, wherein it is noted that the housing 14 is secured to this sheet-like surface by screws 40 extending through the housing flange 15 and threaded into the surface or a support thereabove. The cover plate 18 is releasably held to the housing flange 15 by means of further screws 42 and interposed gaskets or washers 43, the last named screws being threadedly engaged by nut members above flange 15. In order to prevent vibration, cushion and sealing members 44 are interposed between the diffusing panel 29 and the housing at appropriate points above the flange 29' of the panel, thereby resiliently cushioning and protecting said panel and holding the same in place without rattle, while at the same time sealing the panel interior against entry of dust.

A modified and somewhat improved form of dual housing is illustrated in Figs. 6 and 7 wherein those structural details of this embodiment which are similar to the housing of Figs. 2, 3, 4 and 5 are designated by like reference numerals. In this form the housing chamber 45 is similar in all respects to the corresponding chamber 20 of the first described modification, except for the fact that it is fabricated in a generally rectangular outline omitting the V-shaped wall 23 which subdivides the two halves of the chamber in the form shown in Fig. 4. A depending light stop panel 46 is substituted for the V-shaped wall configuration referred to, to insure emission of individual, unmixed beams from the two sources 27.

The other chamber, designated 47, which corresponds to the chamber 19 of the first embodiment, has a similar sectional outline in the form of a right angle triangle whose hypotenuse parallels the light panel 29 for said chamber. The electrical fitting for the lamp 25 is carried in an aperture on one of the other two sides of the chamber in such manner that the lamp is disposed centrally of the chamber 47. In other respects the housing of Figs. 6 and 7 substantially duplicates that of Figs. 2 through 4 in providing separate or dual light chambers, one of which houses two individual sources of illumination, which are arranged in a manner whereby the individual respective reading beams issuing therefrom converge and cross. A similar advantage of increased compactness is attained, by comparison with a housing in which the light sources are arranged for divergent beam emission.

In operation, the individual seat occupants control the individual illumination at their individual seat areas as desired, by manipulating the convenient switches 36. One passenger may extinguish his reading beam and recline in his seat without being objectionably subjected to an adjacent beam directed at his immediate neighbor's seat area, inasmuch as the positioning of the intersecting beams avoids direct impingement of either on the seat area immediately therebeneath. When the vehicle has reached a station or other stop, the operator can achieve a uniform diffused and cheerful lighting of the bus interior by actuating switch 38 to illuminate all the lamps 25. The downwardly projecting character of the panels 29 enables a substantial flooding of the vehicle interior. Also, if desired, the operator can at this time open master switch 39 to extinguish all of the individual lamps 27, even though some of the switches 36 be closed.

Of course those skilled in the art will readily perceive the possibility of modifying the foregoing system and fixture and still obtain the above-described advantages thereof, without departing from the principle of the invention. Therefore the invention should be construed as broadly as is reasonably consistent with the language of the appended claims, and to cover all reasonable equivalents of the structure set forth.

We claim:

1. In a light fixture, a light housing provided with an externally exposed face plate and having a pair of laterally enclosed light chambers disposed behind said plate, one of which is a dual lamp chamber, said chambers being oriented in a front-to-rear relation to one another, a pair of lamps in said dual chamber, individual tubular beam directing elements for said respective lamps disposed in fixed relation to said face plate to extend rearwardly thereof for a substantial distance into said dual lamp chamber, thereby to effect full side control behind said face plate of beams projected from said lamps into the space forwardly of said face plate, said lamps being positioned in direct light transmissive relation to the interior of said tubular elements, the longitudinal axes of said elements being disposed to converge in the direction forwardly of said face plate and in directions transverse of the front-to-rear direction of orientation of said chambers, a light source in the other chamber, and a diffusing panel carried by said face plate in light transmissive relation to said source.

2. A fixture in accordance with claim 1, in which said light housing is in the form of a one-piece element shaped to define said light chambers, and includes integral means to shield the lamps in said dual lamp chamber from one another.

3. In a light fixture, a light housing provided with an externally exposed face plate and having a pair of laterally enclosed light chambers disposed behind said plate, one of which is a dual lamp chamber, said chambers being oriented in a front-to-rear relation to one another, a pair of lamps in said dual chamber, individual tubular beam directing elements for said respective lamps disposed in fixed relation to said face plate to extend rearwardly thereof for a substantial distance into said dual lamp chamber, thereby to effect full side control, behind said face plate, or beams projected from said lamps into the space forwardly of said face plate, said lamps being positioned in direct light transmissive relation to the interior of said tubular elements, the longitudinal axes of said elements being disposed to converge in the direction forwardly of said face plate and in directions transverse of the front-to-rear direction of orientation of said chambers, a light source in the other chamber, and a diffusing panel carried by said face plate in light transmissive relation to said source, said diffusing panel extending substantially forwardly of said face plate and into said space for the lateral emanation of diffused rays sidewise of said face plate.

4. A fixture in accordance with claim 3 in which said light housing is in the form of a one-piece element shaped to define said light chambers, and includes integral means to shield the lamps in said dual lamp chamber from one another.

5. In a light fixture, a light housing provided with an externally exposed face plate and having a pair of laterally enclosed light chambers disposed behind said plate, one of which is a dual lamp chamber, said chambers being oriented in a front-to-rear relation to one another, a pair of lamps in said dual chamber, individual tubular beam directing elements for said respective lamps disposed in fixed relation to said face plate to extend rearwardly thereof for a substantial distance into said dual lamp chamber, thereby to effect full side control behind said face plate of beams projected from said lamps into the space forwardly of said face plate, said lamps being positioned in direct light transmissive relation to the interior of said tubular elements, the longitudinal axes of said elements being disposed to converge in the direction forwardly of said face plate and in directions transverse of the front-to-rear direction of orientation of said chambers, a light source in the other chamber, a diffusing panel carried by said face plate in light transmissive relation to said source, individual switches directly associated with said fixture and electrically connected to said respective lamps, and a further switch in remote relation to said fixture which is electrically connected to said light source.

6. In a light fixture, a light housing provided with an externally exposed face plate and having a pair of laterally enclosed light chambers disposed behind said plate, one of which is a dual lamp chamber, said chambers being oriented in a front-to-rear relation to one another, a pair of lamps in said dual chamber, individual tubular beam directing elements for said respective lamps disposed in fixed relation to said face plate to extend rearwardly thereof for a substantial distance into said dual lamp chamber, thereby to effect full side control, behind said face plate, of beams projected from said lamps into the space forwardly of said face plate, said lamps being positioned in direct light transmissive relation to the interior of said tubular elements, the longitudinal axes of said elements being disposed to converge in the direction forwardly of said face plate and in directions transverse of the front-to-rear direction of orientation of said chambers, a light source in the other chamber, a diffusing panel carried by said face plate in light transmissive relation to said source, said diffusing panel extending substantially forwardly of said face plate and into said space for the lateral emanation of diffused rays sidewise of said face plate, individual switches directly associated with said fixture and electrically connected to said respective lamps, and a further switch in remote relation to said fixture which is electrically connected to said light source.

ALBERT L. ARENBERG.
EDWARD C. ZIMMERMAN.

REFERENCES CITED

The following references are of record in the file of this patent:

UNITED STATES PATENTS

| Number | Name | Date |
| --- | --- | --- |
| D. 141,064 | Zimmerman | May 1, 1945 |
| D. 150,104 | Arenberg et al. | July 6, 1948 |
| 1,198,065 | Schepmoes | Sept. 12, 1916 |
| 1,655,399 | Wagner | Jan. 3, 1928 |
| 1,961,836 | Warner | June 5, 1934 |
| 2,179,161 | Rambusch et al. | Nov. 7, 1939 |
| 2,217,688 | Larson et al. | Oct. 15, 1940 |
| 2,244,738 | Alm | June 10, 1941 |
| 2,302,092 | Arenberg | Nov. 17, 1942 |
| 2,304,861 | Thee | Dec. 15, 1942 |
| 2,461,446 | Schepmoes | Feb. 8, 1949 |

FOREIGN PATENTS

| Number | Country | Date |
| --- | --- | --- |
| 314,133 | England | 1929 |
| 519,494 | England | Mar. 28, 1940 |